No. 12,137. REISSUED JULY 28, 1903.

A. DE VILBISS, JR.

SCALE.

APPLICATION FILED NOV. 16, 1901.

WITNESSES:

Harold S. Barnett.

Louis B. Erwin.

INVENTOR:

Allen De Vilbiss Jr.

By Rector & Hibben his attys.

No. 12,137. Reissued July 28, 1903.

UNITED STATES PATENT OFFICE.

ALLEN DE VILBISS, JR., OF TOLEDO, OHIO, ASSIGNOR, BY MESNE ASSIGNMENTS, TO TOLEDO SCALE AND CASH REGISTER COMPANY, OF NEWARK, NEW JERSEY, A CORPORATION OF NEW JERSEY.

SCALE.

SPECIFICATION forming part of Reissued Letters Patent No. 12,137, dated July 28, 1903.

Original No. 649,915, dated May 22, 1900. Application for reissue filed November 16, 1901. Serial No. 82,576.

*To all whom it may concern:*

Be it known that I, ALLEN DE VILBISS, Jr., a citizen of the United States, residing at Toledo, in the county of Lucas and State of Ohio, have invented certain new and useful Improvements in Scales, of which the following is a description, reference being had to the accompanying drawings, forming part of this specification.

My invention relates to and has for its object the improvement of what are commonly known as "computing" or "price" scales, being scales which indicate not only the weight of the article or commodity being weighed, but also its value at any given rate per pound (or other unit of weight) within the capacity of the scale.

Figure 1:
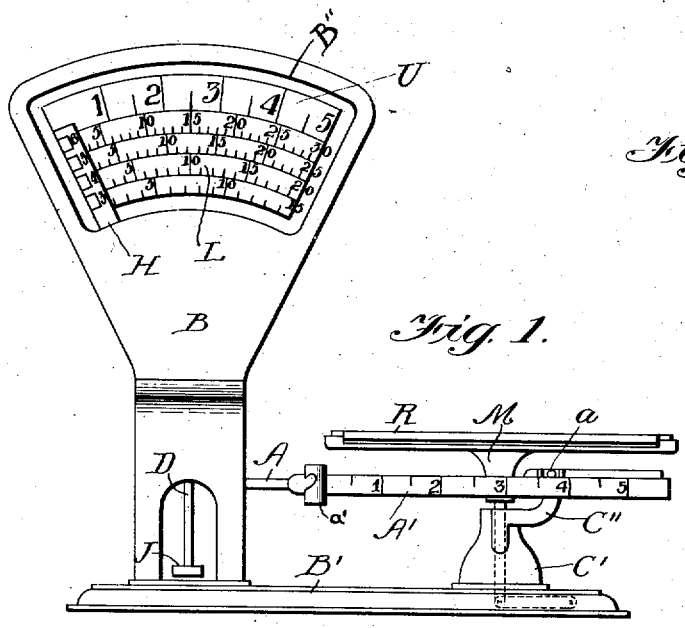
Figure 2:
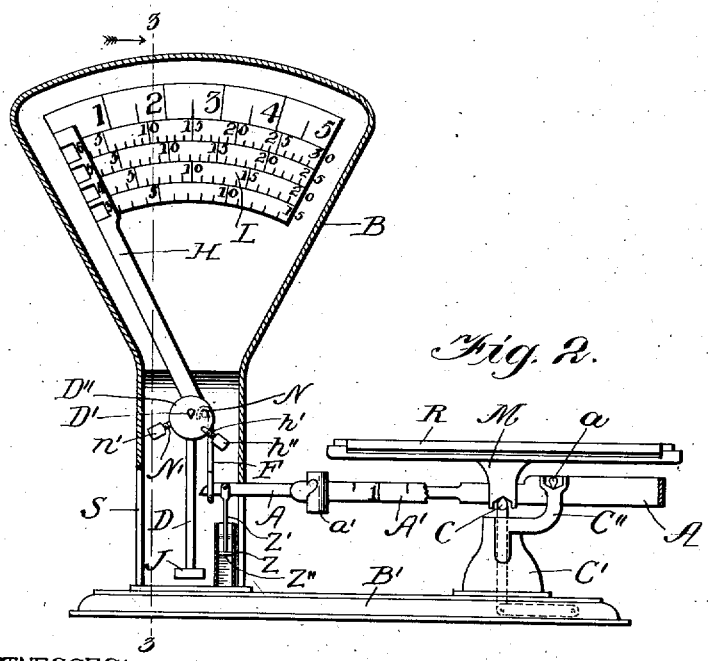

In the accompanying drawings, Figure 1 represents a front elevation of my improved scale; Fig. 2, a corresponding view with the housing or casing in section exposing the parts within, and Fig. 3 a vertical cross-section on the line 3 3 of Fig. 2.

The same letters of reference represent corresponding parts in the several views.

B represents a housing or case of suitable shape secured upon the base B′, near one end thereof, and having its front side or wall provided in its upper portion with an opening B″, through which is exposed to view the price-computing table L, secured within the housing. Coöperating with this table is the upper end of an index-hand H, whose lower end is rigidly secured to a disk D″, provided upon its opposite sides with knife-edge projections D′, resting in suitable bearings E upon the front and rear walls of the housing, Figs. 2 and 3. Rigidly secured to and depending vertically from the under side of the disk D″ is a pendulum D, provided with a weight J at its lower end. The index-hand H projects from the disk D″ at an angle to the pendulum D, so that when the latter hangs in its normal vertical position the upper end of the index-hand will extend across the left-hand end of the computing-table L, as shown, and when the lower end of the pendulum is swung to the left the upper end of the hand H will be moved to the right over the table L. The housing B is provided with an opening S in its left side, Fig. 2, through which the pendulum may swing.

Figure 3:
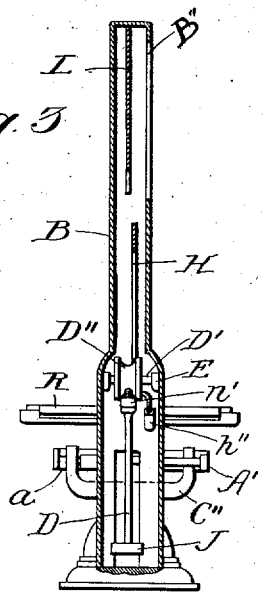

Mounted upon the base B′ near its right-hand end is a scale-beam support C′, provided with two divergent supporting-arms C″, whose upper ends are suitably shaped to form supporting-bearings for knife-edge projections *a* on the scale-beam A, Figs. 2 and 3. The scale-beam A is forked or formed of two opposite members at its right-hand end embracing the supporting-arms C″, as shown, while at its left-hand end it extends through a vertical opening in the right-hand side wall of the housing B and has connected to it the lower end of a link F, whose upper end is connected to the disk D″ at a point on one side of and above the pivotal support D′ of said disk, the disk in the present instance being provided with a projecting knife-edge or pivot N, over which hooks the upper end of the link F.

Supported upon the scale-beam A by knife-edge bearings C, at a point to the left of but adjacent the fulcrum-support *a* of said beam, is the standard M of the scale-platform (or pan) R, said platform in addition to being supported upon the scale-beam A being guided in its vertical movements and held from lateral displacement by the usual means within the support C. (Shown in the dotted lines in Figs. 1 and 2.)

As will be understood from the above-described construction, when the article or commodity which is to be weighed and whose value is to be computed is placed upon the platform B its weight will tend to depress the left-hand end of the scale-beam A, and thereby through the connection of said beam with the disk D″ by the link F to swing the pendulum D to the left from its normal vertical position and move the upper end of the index-hand H to the right over the computing-table L, the weight and leverage of the pendulum serving to automatically counterbalance the weight of the article placed upon the platform and cause the index-hand to come to rest at a point upon the table L determined by the weight of such article. This table L is curved in the arc of a circle concentric to the pivotal support of the index-hand H and is provided with a plurality of curved lines separating it into a plurality of curved spaces, of which five are in the present instance shown in the drawings. The uppermost one of said spaces (marked U) is graduated and numbered to indicate units of weight and fractions thereof—in the present instance pounds and half-pounds from one to five. The remaining spaces are graduated and numbered to indicate the values of different articles or quantities of commodities at different prices per pound. Thus the lowermost one of said spaces is graduated and numbered to indicate the value of any given quantity (up to five pounds) at three cents per pound, the next space the same at four cents per pound, the next space at five cents per pound, and the uppermost one of the four spaces at six cents per pound. These prices per pound are indicated by numbers placed upon the index-hand H in line with the respective curved spaces mentioned, and the construction and adjustment and coöperation of the several parts of the scale are such that when the hand H is swung to the right over the table L to any given point by the weight of the article or commodity placed upon the platform R the value of such article at any of the prices per pound indicated upon the index-hand H will be shown in the corresponding curved space upon the table L at a point immediately adjacent said hand, while its weight will be shown in the uppermost curved space U. In the present instance the hand H is provided with a series of notches or openings adjacent the respective numbers upon it, through which the graduations and numbers upon the table L may be read.

For the purpose of counterbalancing the weight of the index-hand H the disk D″ is provided upon its side opposite said hand with a projecting screw $h'$, upon which is mounted an adjustable counterbalancing-weight $h''$, while to counterbalance the weight of the link F the disk D″ is provided at a point diametrically opposite the link-pivot N with a second projecting screw N″, upon which is mounted an adjustable counterbalancing-weight $n'$.

To permit commodities to be weighed in receptacles placed upon the platform R and their weight and value to be properly indicated upon the computing-table notwithstanding the additional weight of such receptacles, I provide the main scale-beam A with a tare-beam A′, upon which is mounted a tare-poise $a'$. This tare-beam is made of considerable length, extending beyond the fulcrum of the main beam, as shown in Fig. 1, in order to afford a large space for each unit of weight and in the present instance is graduated and numbered to indicate pounds and half-pounds from one to five to correspond with the graduations in the space U on the table L. When the tare-poise $a'$ is in its left-hand or normal position, Figs. 1 and 2, the main scale-beam is exactly balanced and the index-hand H rests in the position shown upon the computing-table L. When a receptacle is placed upon the platform R preparatory to placing something in said receptacle to be weighed, the left-hand end of the scale-beam A will be depressed by the weight of such receptacle and the index-hand H swung to the right over the table L, indicating the weight of such receptacle in the space U; but by then sliding the tare-poise $a'$ to the right along the tare-beam A′ to a point or graduation corresponding to such weight indication the main scale-beam may be again balanced and the index-hand H brought back to normal position at the left-hand end of the computing-table, whereupon the commodity to be weighed in the receptacle may be placed in the latter and its weight and value be read upon the computing-table in the same manner as if it were placed directly upon the platform R.

To arrest the vibrations of the scale-beam A, and consequently of the index-hand H, and cause the latter to speedily come to rest at the proper point upon the table L after the article to be weighed has been placed upon the platform R, or after the poise $a'$ has been adjusted upon the tare-beam A′, I provide a dash-pot-arresting device comprising an upright dash-pot or cylinder Z, located within the base of the housing B and containing oil or other suitable fluid, in which moves a piston Z″, whose rod Z′ is connected at its upper end to the scale-beam A adjacent the point of connection of the latter with the lower end of the link F, as shown in Fig. 2.

As will be understood from the foregoing description, the operation of weighing and computing the value of any article or commodity which may be placed directly upon the platform R (or in the usual scale pan or scoop which may be substituted for said platform) consists simply in placing such article or commodity upon said platform, whereupon both its weight and value will be instantly and automatically indicated upon the computing-table L, while if the commodity to be weighed requires a special receptacle for it upon the scale-platform the weight of such receptacle may be first counterbalanced by means of the poise upon the tare-beam, whereupon the placing of the article or commodity in said receptacle will cause its weight and value to be at once automatically indicated upon the computing-table. Likewise if instead of employing the scale to indicate the weight and value of a given article or a given quantity of any commodity it be desired to employ it for the purpose of weighing out the proper quantity of a commodity to be furnished for a given amount of money at a given rate per pound it is simply necessary to place upon the scale-platform a sufficient quantity of such commodity to move the index-hand H over the table L until it reaches the graduation indicating such amount of money in the particular curved space corresponding to the given rate per pound. In both cases the weighing and computing operation is entirely automatic, simply requiring the placing of the article or commodity upon the scale-platform.

Having thus described my invention, I claim—

1. In a computing-scale, the combination of a price-computing table L provided with the graduations and numbers indicating the value of different quantities of commodities at different prices per pound, the index-hand H pivoted at one end and coöperating at its opposite end with the table L and provided with the series of numbers indicating prices per pound, the vertically-depending weighted pendulum D connected at its upper end with the index-hand H and moving in unison therewith, a single scale-beam A fulcrumed near its outer end upon a suitable support at *a* and having its inner end connected with the index-hand H and pendulum D by the link F, and the platform R supported entirely upon said single beam A between the fulcrum *a* and the link F; substantially as described.

2. In a computing-scale, the combination of the price-computing table L provided with the graduations and numbers indicating the value of different quantities of commodities at different prices per pound, the index-hand H pivoted at one end and coöperating at its opposite end with the table L and provided with a series of numbers indicating different prices per pound, the vertically-depending weighted pendulum D connected at its upper end with the index-hand H and moving in unison therewith, a single scale-beam A fulcrumed near its outer end upon a suitable support at *a* and having its inner end connected with the index-hand H and pendulum D by the link F, the platform R supported entirely upon the single beam A between its fulcrum *a* and the link F, the dash-pot Z and the piston Z″ moving therein and having its rod Z′ connected to a moving part of the scale mechanism; substantially as and for the purpose set forth.

3. In a computing-scale, the combination of the price-computing table L provided with the graduations and numbers indicating the value of different quantities of commodities at different prices per pound, the index-hand H pivoted at one end and coöperating at its opposite end with the table L and provided with the series of numbers indicating different prices per pound, the vertically-depending weighted pendulum D rigidly connected at its upper end with the index-hand H and moving in unison therewith, the scale-beam A fulcrumed near its outer end upon a suitable support at *a* and having its inner end connected with the index-hand H and pendulum D by the link F, the platform R mounted on the beam A between its fulcrum *a* and the link F, the tare-beam A′ carried by the scale-beam A in front of and parallel with the same, and the poise *a*′ mounted on said tare-beam, substantially as and for the purpose described.

4. In a computing-scale, the combination of the price-computing table L provided with the graduations and numbers indicating the value of different quantities of commodities at different prices per pound, the index-hand H pivoted at one end and coöperating at its other with the table L and provided with the series of numbers indicating different prices per pound, the weighted pendulum D rigidly connected at its upper end with the index-hand H and moving in unison therewith, the scale-beam A fulcrumed near its outer end upon a suitable support at *a* and having its inner end connected with the index-hand H and pendulum D, the platform R mounted on the beam A between its fulcrum *a* and the link F, the tare-beam A′ carried by the scale-beam A, the poise *a*′ mounted on said tare-beam, the dash-pot Z, and the piston Z″ moving therein and having its rod Z′ connected to the scale-beam A for arresting the vibration of the scale-beam after movement of the poise *a*′ upon the tare-beam and also after the placing of the commodity to be weighed upon the platform or in the receptacle thereon; substantially as described.

5. In a computing-scale, the combination of a price-computing table L provided with graduations and numbers indicating the values of different quantities of commodities at different prices per pound, the disk or hub D″ provided with the knife-edge trunnions D′ projecting from its front and rear sides and resting in supporting-bearings E, the index-hand H rigidly secured at its lower end to the disk D″ and at its upper end coöperating with the table L and provided with a series of numbers indicating prices per pound, the vertically-depending weighted pendulum D rigidly secured at its upper end to the disk D″, the link-pivot N carried by the disk D″ and normally standing at a point above the pivotal axis of the latter, means carried by the disk D″ for counterbalancing the weight of the index-head H and link-pivot N, the scale-beam A fulcrumed near its outer end upon a suitable support at *a* and connected at its inner end with the link-pivot N by the link F, and the platform R mounted on the beam A between the fulcrum *a* and the link F; substantially as described.

6. In a computing-scale, the combination of a price-computing table L provided with graduations and numbers indicating the values of different quantities of commodities at different prices per pound, the disk or hub D″ provided with the knife-edge trunnions D′ projecting from its front and rear sides and resting in supporting-bearings E, the index-hand H rigidly secured at its lower end to the disk D″ and at its upper end coöperating with the table L and provided with a series of numbers indicating prices per pound, the vertically-depending weighted pendulum D rigidly secured at its upper end to the disk D″, the link-pivot N carried by the disk D″ and normally standing at a point above the pivotal axis of the latter, means carried by the disk D″ for counterbalancing the weight of the index-hand H and link-pivot N, the scale-beam A fulcrumed near its outer end upon a suitable support at *a* and connected at its inner end with the link-pivot N by the link F, the platform R mounted on the beam A between the fulcrum *a* and the link F, the dash-pot Z and the piston Z″ moving therein and having the upper end of its rod Z′ connected to the scale-beam A adjacent the link F; substantially as and for the purpose described.

7. In a computing-scale, the combination of a price-computing table L provided with graduations and numbers indicating the values of different quantities of commodities at different prices per pound, the disk or hub D″ provided with the knife-edge trunnions D′ projecting from its front and rear sides and resting in supporting-bearings E, the index-hand H rigidly secured at its lower end to the disk D″ and at its upper end coöperating with the table L and provided with a series of numbers indicating prices per pound, the vertically-depending weighted pendulum D rigidly secured at its upper end to the disk D″; the link-pivot N carried by the disk D″ and normally standing at a point above the pivotal axis of the latter, means carried by the disk D″ for counterbalancing the weight of the index-hand H and link-pivot N, the scale-beam A fulcrumed near its outer end upon a suitable support at *a* and connected at its inner end with the link-pivot N by the link F, the platform R mounted on the beam A between the fulcrum *a* and the link F, the tare-beam A′ mounted on the scale-beam A, and the poise *a′* mounted on said tare-beam; substantially as and for the purpose described.

8. In a computing-scale, the combination of a price-computing table L provided with graduations and numbers indicating the values of different quantities of commodities at different prices per pound, the disk or hub D″ provided with the knife-edge trunnions D′ projecting from its front and rear sides and resting in supporting-bearings E, the index-hand H rigidly secured at its lower end to the disk D″ and at its upper end coöperating with the table L and provided with a series of numbers indicating prices per pound, the vertically-depending weighted pendulum D rigidly secured at its upper end to the disk D″, the link-pivot N carried by the disk D″ and normally standing at a point above the pivotal axis of the latter, means carried by the disk D″ for counterbalancing the weight of the index-hand H and link-pivot N, the scale-beam A fulcrumed near its outer end upon a suitable support at *a* and connected at its inner end with the link-pivot N by the link F, the platform R mounted on the beam A between the fulcrum *a* and the link F, the tare-beam A′ mounted on the scale-beam A, the poise *a′* mounted on said tare-beam, the dash-pot Z, and the piston Z″ moving therein, and having the upper end of its rod Z′ connected to the scale-beam adjacent the link F; substantially as and for the purpose set forth.

9. The herein-described computing-scale comprising the base B′, the housing B mounted thereon near one end and provided in its upper portion with the opening B″, the price-computing table L located within the housing B and exposed to view through said opening, the disk D″ pivotally supported in the housing B, the index-hand H rigidly secured at its lower end to the disk D″ and coöperating at its upper end with the price-computing table L, the weighted pendulum D rigidly secured at its upper end to the disk D″, the scale-beam support C′ C″ mounted upon the opposite end of the base B′ from the housing B, the scale-beam A fulcrumed thereon at *a*, the link F connecting the opposite end of the beam A with the disk D″, means on said disk for counterbalancing the weight of the link F and index-hand H, the platform R mounted on the beam A between its fulcrum *a* and the link F, the dash-pot Z and the piston Z″ moving therein and having the upper end of its rod Z′ connected to the beam A adjacent the link F; substantially as described.

10. In a scale, the combination with the central pivot, a disk mounted thereon and having a pendulum hanging normally vertical, and an index standing normally oblique, a link-pivot connected with this disk and at a point normally above said central pivot, a screw projecting from the disk opposite the link-pivot and a counterbalancing-weight adjustable on this screw; of a table with which the index coacts, a beam mounted on a fulcrum, a pan or platform, and a link connecting said beam with the link-pivot, all substantially as and for the purpose set forth.

11. In a scale, the combination with the housing having bearings, a disk having a central pivot mounted therein, a pendulum hanging normally vertical from the disk, an index standing normally oblique to this pendulum, a link-pivot connected to the disk and normally above its central pivot, screws projecting from the disk, and counterbalancing-weights adjustable on said screws; of a beam mounted on a fulcrum, a pan or platform, and a link connecting the beam with the link-pivot, all substantially as described.

ALLEN DE VILBISS, JR.

Witnesses:
HENRY THEOBALD,
EMMA EIBEN.